United States Patent
Medvedovsky et al.

(10) Patent No.: US 10,374,918 B2
(45) Date of Patent: Aug. 6, 2019

(54) METHOD AND SYSTEM FOR CONFIGURING BEHAVIORAL NETWORK INTELLIGENCE SYSTEM USING NETWORK MONITORING PROGRAMMING LANGUAGE

(71) Applicant: RADWARE, LTD., Tel Aviv (IL)

(72) Inventors: Lev Medvedovsky, Netanya (IL); David Aviv, Tel Aviv (IL); Avi Chesla, Tel Aviv (IL)

(73) Assignee: Radware, Ltd., Tel Aviv (IL)

( * ) Notice: Subject to any disclaimer, the term of this patent is extended or adjusted under 35 U.S.C. 154(b) by 670 days.

(21) Appl. No.: 14/560,872

(22) Filed: Dec. 4, 2014

(65) Prior Publication Data

US 2015/0154494 A1    Jun. 4, 2015

Related U.S. Application Data

(60) Provisional application No. 61/911,813, filed on Dec. 4, 2013.

(51) Int. Cl.
| | | |
|---|---|---|
| *G06N 5/04* | (2006.01) | |
| *G06N 5/02* | (2006.01) | |
| *H04L 12/26* | (2006.01) | |
| *H04L 12/24* | (2006.01) | |

(52) U.S. Cl.
CPC ............... *H04L 43/08* (2013.01); *G06N 5/02* (2013.01); *G06N 5/025* (2013.01); *G06N 5/04* (2013.01); *H04L 41/16* (2013.01); *H04L 43/04* (2013.01); *H04L 43/0894* (2013.01)

(58) Field of Classification Search
CPC . G06N 5/02; G06N 5/025; G06N 5/04; H04L 12/26; H04L 43/08
See application file for complete search history.

(56) References Cited

U.S. PATENT DOCUMENTS

| | | | |
|---|---|---|---|
| 9,038,151 B1 * | 5/2015 | Chua | H04L 45/02 709/223 |
| 9,083,740 B1 | 7/2015 | Ma et al. | |
| 2004/0205772 A1 | 10/2004 | Uszok et al. | |
| 2012/0079101 A1 * | 3/2012 | Muppala | H04L 47/2441 709/224 |

(Continued)

OTHER PUBLICATIONS

Foster, Nate, et al. "Languages for software-defined networks." IEEE Communications Magazine 51.2 (2013): 128-134.*

*Primary Examiner* — Eric Nilsson
(74) *Attorney, Agent, or Firm* — M&B IP Analysts, LLC

(57) ABSTRACT

A method and system for configuring a behavioral network intelligence system using a network monitoring programming language are provided. The method includes defining at least one target of a traffic segment to be monitored using at least one application path attribute of an application, wherein the application is accessed via at least one user device connected to a network, wherein the at least one application path attribute is defined respective of an application path keyword and an application path assessment keyword; and defining at least one condition representing the behavior of the at least one application path attribute of the application, the at least one target and the at least one condition can be interpreted by a monitoring system to allow for determining a behavioral impact of the application on the network.

26 Claims, 9 Drawing Sheets

(56) References Cited

U.S. PATENT DOCUMENTS

| | | |
|---|---|---|
| 2014/0003422 A1 | 1/2014 | Mogul et al. |
| 2014/0043993 A1 | 2/2014 | Sirotkin et al. |
| 2014/0052877 A1 | 2/2014 | Mao |
| 2014/0098673 A1 | 4/2014 | Lee et al. |
| 2014/0123211 A1 | 5/2014 | Wanser et al. |
| 2014/0123212 A1 | 5/2014 | Wanser et al. |
| 2014/0237456 A1 | 8/2014 | Monclus et al. |
| 2014/0241346 A1 | 8/2014 | Cohn et al. |
| 2014/0241347 A1 | 8/2014 | Yadav et al. |
| 2014/0245443 A1 | 8/2014 | Chakraborty |
| 2014/0280488 A1 | 9/2014 | Voit et al. |
| 2014/0280835 A1 | 9/2014 | Pruss et al. |
| 2014/0280893 A1 | 9/2014 | Pfeifer et al. |
| 2014/0282628 A1 | 9/2014 | Pruss et al. |
| 2014/0307556 A1 | 10/2014 | Zhang |
| 2014/0325038 A1 | 10/2014 | Kis |
| 2014/0359697 A1 | 12/2014 | Ji |
| 2015/0052243 A1 | 2/2015 | Lumezanu et al. |

\* cited by examiner

| | | | | PPS | CUC | Bytes | Symmetry | CPS | # Users | ... |
|---|---|---|---|---|---|---|---|---|---|---|
| Dest L4 Port | | | | 2000 | 20K | 1M | In 100% | 2K | | |
| | Application A | | | 2000 | | | | | | |
| | | Browser type A | | 1010 | | | | | | |
| | | | OS1 | 1000 | | | | | | |
| | | | OS2 | 10 | | | | | | |
| | | Browser type B | | | | | | | | |
| | Application B | | | | | | | | | |

"Application path" 410

Parameters 420

METHOD AND SYSTEM FOR CONFIGURING BEHAVIORAL NETWORK INTELLIGENCE SYSTEM USING NETWORK MONITORING PROGRAMMING LANGUAGE

CROSS REFERENCE TO RELATED APPLICATIONS

This application claims the benefit of U.S. provisional application No. 61/911,813 filed on Dec. 4, 2013, the contents of which are herein incorporated by reference.

TECHNICAL FIELD

This disclosure generally relates to techniques for monitoring traffic in software defined networks, and particularly for techniques for allowing programmable configuration of various network monitoring functions.

BACKGROUND

A software defined networking (SDN) is a relatively new type of networking architecture that provides centralized management of network elements rather than a distributed architecture utilized by conventional networks. In a distributed architecture, each network element makes routing, switching, and similar decisions based on the results of traffic processing and a distributed control mechanism. In contrast, in an SDN, a network element follows routing or switching decisions received from a central controller.

The operation of a network element can be logically divided into a "control path" and a "data path". In the control path, control protocols for building in, e.g., routing protocols, a spanning tree, and so on, are operable. In the data path, packets-processing operations are performed on a per-packet basis. Such operations include examining each incoming packet and making decisions based on the examination as to how to handle the input packet (via, e.g., packet forwarding, packet switching, bridging, load balancing, and so on). Furthermore, in a conventional network, network elements typically include both the control and data planes, whereas in a native SDN, the network elements include the data path, and the central controller implements the control path.

The SDN can be implemented in wide area networks (WANs), local area networks (LANs) metropolitan area networks (MANs), the Internet, ISP backbones, datacenters, inter-datacenter networks, and the like. Each network element in the SDN may be a router, a switch, a bridge, a load balancer, and so on, as well as any virtual instantiations thereof.

In one configuration of a SDN, the central controller communicates with the network elements using an Open-Flow protocol. Specifically, the OpenFlow protocol allows addition of programmability to network elements for the purpose of packets-processing operations under the control of the central controller, thereby allowing the central controller to dynamically define the traffic handling decisions in the network element. To this end, traffic received by a network element that supports the OpenFlow protocol is processed and forwarded according to a set of rules defined by the central controller.

Traffic received by a network element that supports the OpenFlow protocol is processed and routed according to a set of rules defined by the central controller based on the characteristic of the required network operation. Such a network element routes traffic according to, for example, a flow table, and occasionally sends packets to the central controller. Each network element is programmed with a flow table and can be modified by the central controller as required. The operation of network elements and the definition of flow tables according to the OpenFlow protocol are further described in the OpenFlow Switch Specifications issued by the Open Networking Foundation.

Due to the programmability, scalability, and other features of SDN architectures, network carriers have started to deploy and utilize SDNs as part of their infrastructures to efficiently handle the vast number of mobile devices accessing their respective networks. The use of such mobile devices (e.g., smart phones and tablet computers) has significantly increased and, in many cases, such mobile devices have become primary replacements for other computing devices.

Network carriers allow access to data by the mobile device through a variety of applications. The data bandwidth consumption (in both directions, i.e., upload and download of data) by applications installed in mobile devices through, for example, cellular networks, tends to congest or overload the network's resources. This is due to, for example, the way applications are programmed, the asynchronous demand for data bandwidth by applications, and the ways in which users interact with applications. For example, an application can be programmed with an embedded security breach that causes data transmission over the network to external users. As another example, an application can be poorly programmed to continuously synchronize with application servers, thereby continuously receiving and transmitting data over the network.

Monitoring and detecting the behavioral impact of applications such as, for example, applications that congest or overload the network's resources, is not a straightforward task. This difficulty occurs due to the number of available applications, the different types of mobile devices, and the sporadic usage of applications. For example, an application can exhibit a security breach when running on an Android® operating system, but not when running on iOS®. In some cases, the same application can operate properly in conjunction with iOS® version 'x', but not in conjunction with iOS® version 'y.'

The complexity of a solution for detecting the behavioral impact of applications lies in the fact that applications are created and/or updated on a daily basis. Furthermore, applications are no longer normally programmable on a single communication device. That is, an application is typically programmed to be operable on different computing devices, each of which has particular constraints. In addition, the requirements of network carriers with respect to the resources that should be monitored can differ from one carrier to another.

Existing solutions are limited to monitoring the network traffic to detect a set of predefined network events such as, for example, high packet rates over a particular channel, a high latency between two hops in the network, and an ideal network resource. The monitoring is typically performed by hard-coded fuzzy logic inference systems. Such inference systems cannot be rapidly modified and/or scaled to monitor and determine the network behavior with respect to the different applications, resources and/or events. In order to support the needs of network carriers to determine network behavior and the impact of the applications in their various configurations, it is imperative that users (e.g., administrators) of network carries would be able to easily program resources to allow determination of behavior impact of rapidly changing applications and user devices utilizing the network resources.

SUMMARY

A summary of several example aspects of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all aspects nor delineate the scope of any or all aspects. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain embodiments disclosed herein include a method for configuring a behavioral network intelligence system using a network monitoring programming language. The method comprises defining at least one target of a traffic segment to be monitored using at least one application path attribute of an application, wherein the application is accessed via at least one user device connected to a network, wherein the at least one application path attribute is defined respective of an application path keyword and an application path assessment keyword; and defining at least one condition representing the behavior of the at least one application path attribute of the application, wherein the at least one condition is defined using a plurality of terms and Boolean expressions, each of the plurality of terms is defined respective of a behavior keyword and a behavior keyword assessment; wherein the at least one target and the at least one condition can be interpreted by a monitoring system to allow for determining a behavioral impact of the application on the network.

Certain embodiments disclosed herein include a system for determining the behavioral impact of applications on a network. The system comprises a processor; and a memory communicatively connected to the processor, the memory containing a plurality of instructions that, when executed by the processor, configure the system to: define at least one target of a traffic segment to be monitored using at least one application path attribute of an application, wherein the application is accessed via at least one user device connected to a network, wherein the at least one application path attribute is defined respective of an application path keyword and an application path assessment keyword; and define at least one condition representing the behavior of the at least one application path attribute of the application, wherein the at least one condition is defined using a plurality of terms and Boolean expressions, each of the plurality of terms is defined respective of a behavior keyword and a behavior keyword assessment; wherein the at least one target and the at least one condition can be interpreted by a monitoring system to allow for determining a behavioral impact of the application on the network.

BRIEF DESCRIPTION OF THE DRAWINGS

The subject matter disclosed herein is particularly pointed out and distinctly claimed in the claims at the conclusion of the specification. The foregoing and other objects, features, and advantages of the invention will be apparent from the following detailed description taken in conjunction with the accompanying drawings.

FIG. 4 is a diagram of an application path profile data structure.

DETAILED DESCRIPTION

Figure 1:
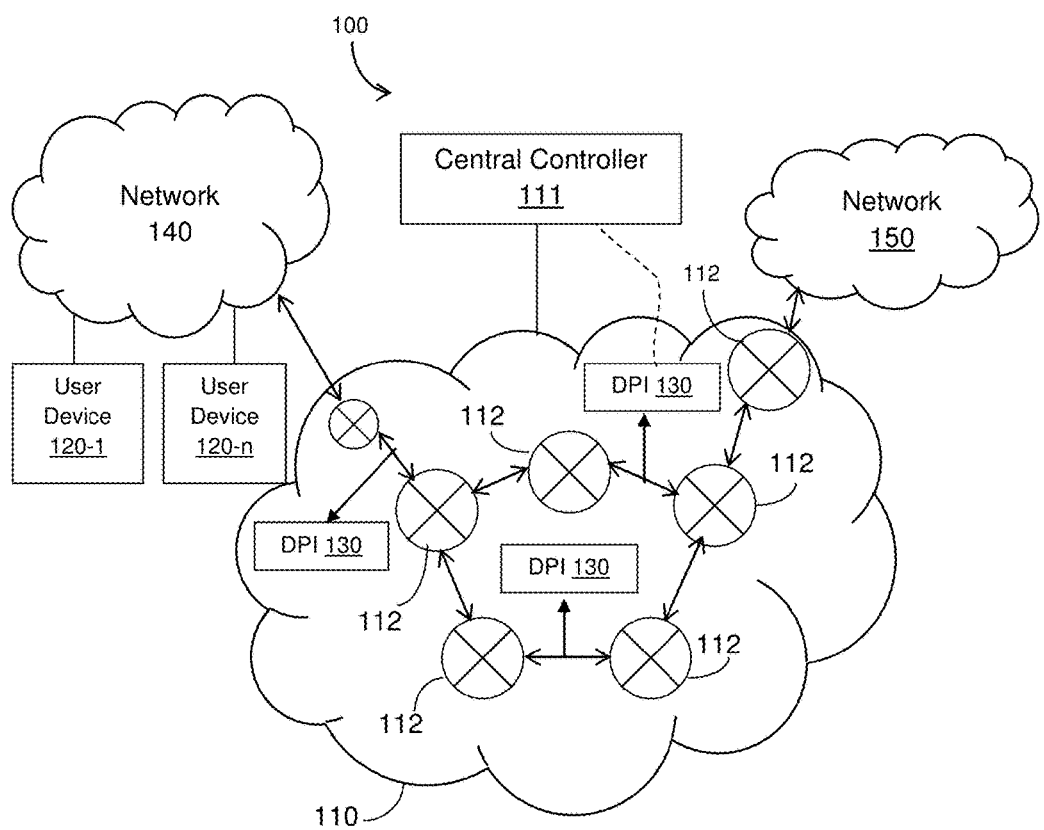
FIG. 1 is a schematic diagram of a network system utilized to describe the various disclosed embodiments.

It is important to note that the embodiments disclosed herein are only examples of the many advantageous uses of the innovative teachings herein. In general, statements made in the specification of the present application do not necessarily limit any of the various disclosed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method for defining, programming, and executing a network monitoring programming language designed for detection and recognition of abnormal behavior of data traffic. Specifically, the disclosed embodiments allow easy, dynamic, and rapid configuration of inference modules for detecting the impact of multi-variance applications, users, and/or user devices on the network carrier. In an embodiment, the disclosed embodiments can be utilized to program behavioral network intelligence systems as discussed in greater detail herein below.

FIG. 1 is an exemplary and non-limiting schematic diagram of a system 100 utilized to describe the various disclosed embodiments. The system 100 includes a software defined network (SDN) 110 communicatively connected to a central controller 111 and containing a plurality of network elements 112. The SDN 110 can be implemented as a wide area networks (WAN), a local area networks (LAN), a service provider backbone, a datacenter, an inter-datacenter network, a private cloud, a public cloud, a hybrid cloud, and the like. The network elements 112 may communicate with the central controller 111 using, for example, an Open Flow protocol over the SDN 110. As noted above, in a SDN, a controller can configure the network elements 112 to perform certain data path operations.

A plurality of deep-packet inspection (DPI) engines 130 are also connected to the SDN 110 via the network elements 112 or by a link between two elements 112. Each DPI engine 130 may be a physical machine and/or a virtual machine. In an embodiment, a DPI engine 130 is deployed as part of the data-plane in a tap mode and is configured to monitor the traffic and to classify the traffic per flow. Each DPI engine 130 is further configured to provide advanced application behavioral analytics with respect to the processed flows. The data collected and analyzed by the DPI engines 130 is sent to the central controller 111 through a protocol utilized by the SDN 110 (e.g., an OpenFlow protocol), or any other type of reporting protocol can be utilized for this purpose.

The DPI engines 130 are part of an elastic DPI fabric in which engines can be dynamically added or removed based on a traffic distribution function controlled by the central controller 111. This fabric allows an elastic scale of traffic flows inspection through the SDN 110. The traffic distribution function is based on a set of traffic parameters and the utilization of the available DPI engines. The networks 140 and 150 are typically external to the SDN 110 and each may be, but is not limited to, a WAN, the Internet, an Internet service provider (ISP) backbone, and the like.

In an exemplary deployment, the network 140 is an access network while the network 150 is the Internet. A plurality of user devices 120-1 through 120-n (collectively referred to as user devices 120, merely for simplicity purposes) is connected to the network 140. A user device 120 may be, for example, a smart phone, a tablet computer, a personal computer, a laptop computer, a notebook computer, a wearable computing device, or any device that can communicate with the network 140. Each of the user devices 120 is installed with an operating system (OS) and can execute one or more applications (apps). Applications can access servers or storage systems (not shown) residing in the network 150 for the purpose of operating the applications. For example, a YouTube® application installed on a user device 120 streams video clips from servers located in the network 150. An application executed or accessed through a user device 120 may be, but is not limited to, a mobile application, a virtual application, a web application, a native application, and the like. It should be noted that all traffic between the networks 140 and 150 pass through the SDN 110.

The central controller 111 is configured to perform a behavioral network intelligence process to determine at least the behavioral impact of applications installed in the user devices 120. To this end, the central controller 111 is configured to aggregate data collected by DPI engines 130, analyze the aggregated data, and generate reports about usage and behavioral impact of applications. The analysis, performed by the central controller 111, includes in part behavioral and security analyses as described in more detail below.

As noted above, the network intelligence behavioral process provides the operator of the SDN 110 with visibility of the behavioral impact of existing mobile applications and of users of such applications. In an embodiment, the behavioral impact is an association of an application path and users with at least one predefined behavior group. A behavior group includes at least a group of application paths operated by users detected to perform activity related to one or more of: network scanning activity, bot activity, chatty activity, and the like.

An application path is defined as a set of one or more attributes related to the application and to usage of the application. Examples for such attributes include a device type (e.g., iPhone, Nokia), an operating system (OS) type and version, a browser type, an application name and version, geographical information, and any metadata (e.g., video codec, user ID, etc.) associated with the application. In certain embodiments, an administrator of the network can configure which applications, attributes of the application path, and network resources to monitor.

The determination of which behavior group an application path is associated with is performed by means of a set of behavioral rules (tasks and queries) defined using the disclosed network monitoring programming language. The network monitoring programming language allows creation of queries defining at least one application path and defining which multivariate behavioral parameters should be satisfied to associate the application path with a specific behavior group. The central controller 111 is pre-configured with a set of behavioral rules (tasks), and can be reconfigured on-the-fly using new behavior rules (tasks) or by modifying existing rules. As will be discussed in greater detail herein below, a behavioral rule is defined respective of a multivariate set of behavioral parameters to determine a deterministic score. A deterministic score is a degree of fulfillment (DoF) of a condition defined for a targeted segment of the traffic in a query. The system continuously evaluates each behavioral parameter to determine its compliance with one or more specific conditions in yielding the DoF.

The DoF defines the behavior group observed by a set of behavioral parameters with respect to an application path. As an example, if a connection rate per source is above a certain threshold level, then the application path is apparently assessed as chatty. The central controller 111 yields a set of DoFs in time intervals utilized to correlate the various monitored parameters. Examples for determinations of DoFs are provided below.

Figure 2:
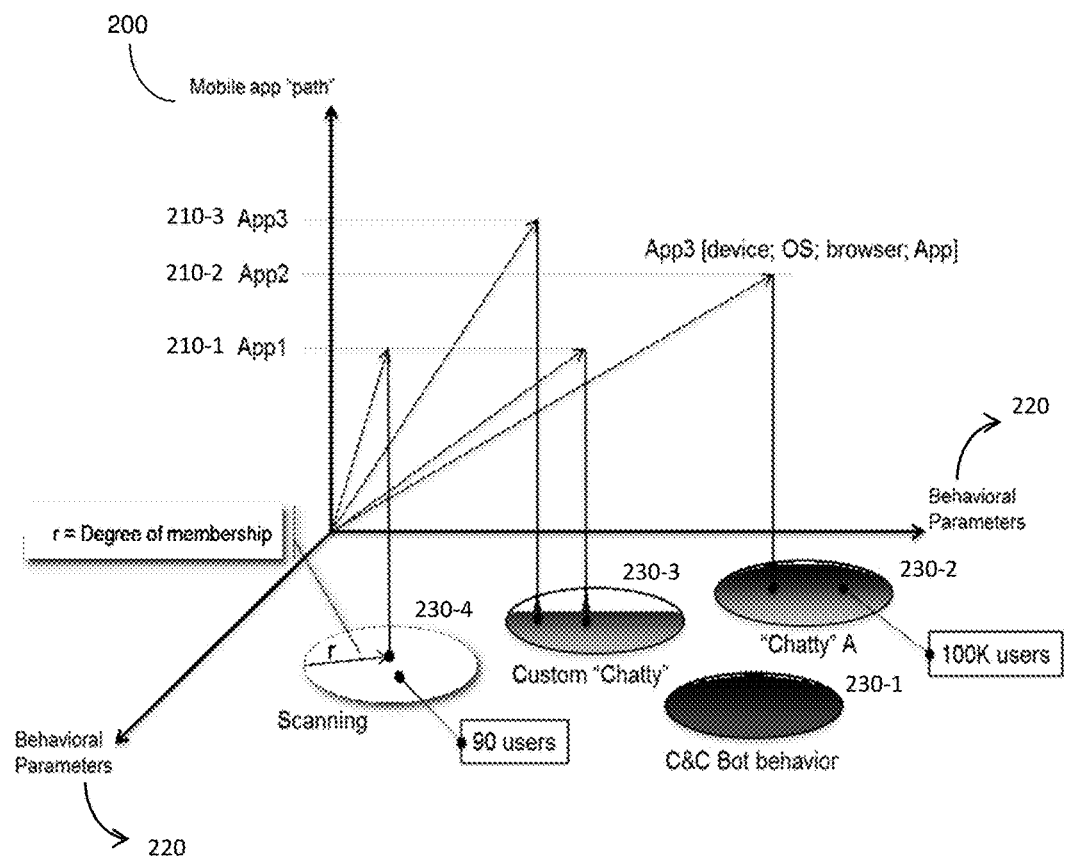
FIG. 2 illustrates a projection of behavioral impact of an application based on extracted traffic characteristic information.

FIG. 2 shows an exemplary graph 200 illustrating the behavioral impact of applications defined through application paths 210-1 (App-1), 210-2 (App-2) and 210-3 (App-3) mapped to a set of behavioral parameters 220. An application path may include attributes such as, but not limited to device type, OS, browser, and application.

The behavioral impact of users of applications defined through application paths 210-1, 210-2, and 210-3 include the behavior groups Bot (or malware) activity 230-1, "chatty" A 230-2 and custom "chatty" 230-3, and scanning activity 230-4. The different between the "chatty" behavior groups 230-2 and 230-3 is the level of activity. In an embodiment, each behavior group includes the number of users associated with this group. Examples for behavioral parameters 220 are provided herein below.

As an example, a mapping of "App-2" 210-2 to "chatty" A group 230-2 indicates that there are 100,000 (100K) users of a "App-1" 210-1 having a Nokia device installed with an outdated OS version. As a result, these devices are infected with spyware that generates a large amount of bandwidth. As another example, it is determined that there are 90 users of "App-1" 210-1 through a scan of the network at a very high rate.

The number of users associated with each behavior group provides a good indication of the impact of an application or an application path on the network. This indication enables network operators/carriers to make educated decisions with respect to their infrastructure and/or services.

Referring back to FIG. 1, in an embodiment, the central controller 111 is configured to program the network elements 112 to distribute copies of traffic through one or more DPI engines 130 connected thereto. Each DPI engine 130 is configured to classify each incoming flow and to assign application path attributes to the flow. Each DPI engine 130 is further configured to gather and add information values of behavioral parameters related to the flow to the application path such as, but not limited to, packet rate, byte rate, TCP state errors, flow symmetry attributes, a data direction (inbound or outbound), a set of new connections per second (CPS) and per application, a concurrent number of connections per application (CUC), an average application flow duration or length (in bytes), a transport protocol (UDP or TCP) state, and so on. In an embodiment, the behavioral parameters are arranged in the DPI engine 130 in a data structure being sent to the central controller 111 at predefined time intervals.

For the purpose of performing the behavioral network intelligence process, the central controller 111 is configured to collect the flow information (e.g., application path and behavioral parameters) from all DPI engines 130 and to aggregate the received information per application and per user. The agreed information is analyzed to determine at least the behavioral impact of applications and users on the network.

Figure 3:
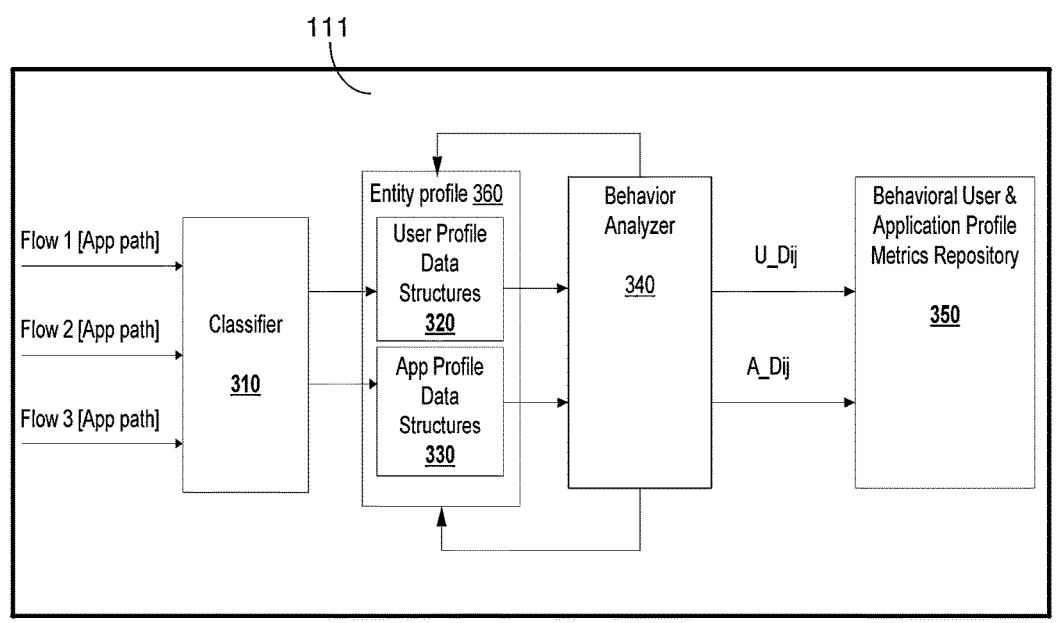
FIG. 3 is a diagram of a central controller used to illustrate the operation of the behavioral network intelligence process according to an embodiment.

FIG. 3 shows an exemplary and non-limiting diagram of the central controller 111 illustrating the operation of the behavioral network intelligence process according to one embodiment.

The central controller 111 includes a classifier 310 configured to receive data from the DPI engines 130 and to create or otherwise update user profile data structures 320 and application profile data structures 330. An application profile data structure 330 is created and updated per application type defined by one or more of the application path attributes mentioned above. A user profile data structure 320 is created and updated per user identified by a user ID. A user ID may be, for example, a source IP address of the user device (e.g., a device 120), a subscription identifier (e.g., MSISDN), a user name, and so on, or any combination thereof.

Each of the user profile data structures 320 and application profile data structures 330 include a set of behavioral parameters. Such parameters include, but are not limited to, a number of transmitted packets or bytes, a transmission rate of packets and bytes, a data direction (inbound or outbound), a set of new connections per second (CPS) and per application, a concurrent number of connections per application (CUC), an average connection duration or size (in bytes), a transport protocol (UDP or TCP) state, and so on. It should be noted that the same set of parameters may be included in a user and application profile, but the aggregation of such parameters may be different.

An exemplary diagram of an application profile data structure 330 is illustrated in FIG. 4. In this example, the highest hierarchy is the destination L4 port which comprises more granular application identity attributes (410) in the application path and the respective profile parameters (420).

According to one embodiment, entity profiles are utilized to evaluate traffic segment using the disclosed language. According to one embodiment, an entity profile 360 includes parameters from one or more application profile and/or one or more user profile, and/or any derivatives thereof.

Referring back to FIG. 3, the user and application profile data structures 320 and 330 are fed to the behavior analyzer 340 at predefined time intervals or upon occurrence of predefined events. The behavior analyzer 340 is configured to characterize or determine the behavior groups of an application path for the users. To this end, the behavior analyzer 340 is configured to generate DoFs according to a set of behavioral rules and the parameters' values in the user and application profiles. The DoFs are generated per user (identified by a user ID) and per an application path and are saved in a repository 350 for future analysis.

As noted above, the different behavioral rules are utilized to characterize the entities of different types of behavior groups. These groups include, for example, a degree of a "chatty" user, a degree of network scanning user activity, a degree of application scanning user activity, a degree of custom behavior user activity, a degree of "chatty" application, and so on.

Figure 5:
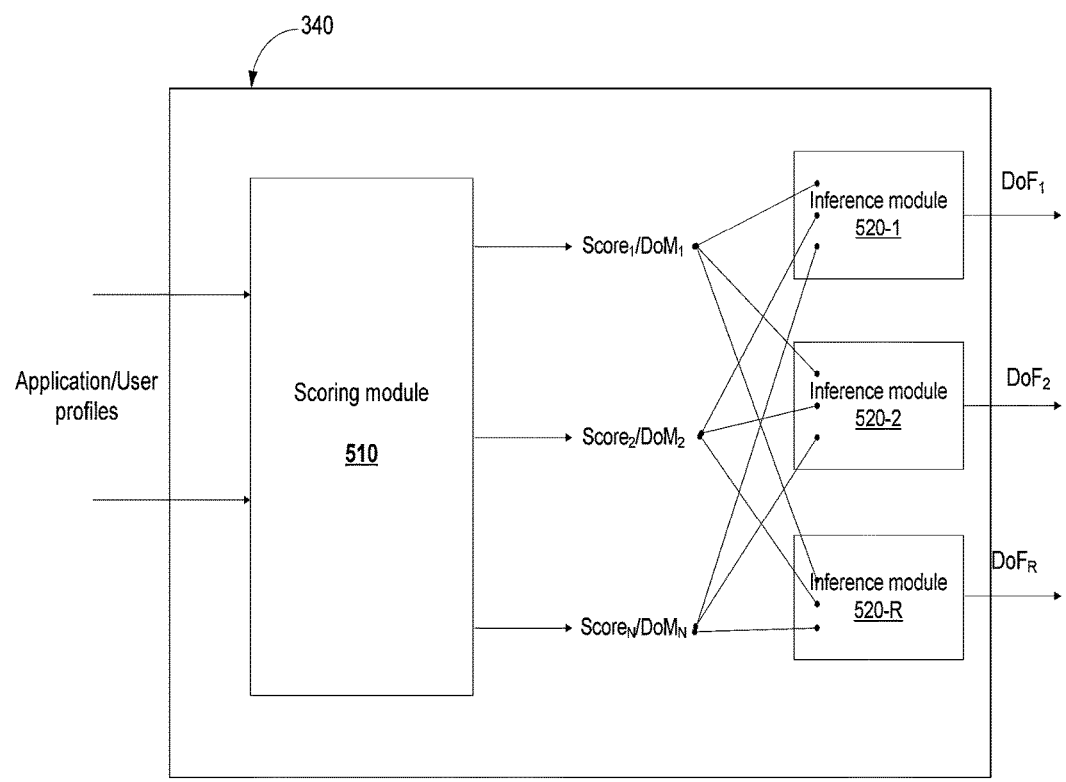
FIG. 5 is a schematic block diagram of a behavior analyzer according to an embodiment.

FIG. 5 illustrates an exemplary and non-limiting behavior analyzer 340 according to one embodiment. The behavior analyzer 340 includes a scoring module 510 and a plurality of inference modules 520-1 thorough 520-R (collectively referred to hereinafter as inference modules 520). The scoring module 510 is configured to compute a plurality of behavioral scores (or degrees of membership (DoM)) based on the parameters saved in the user and/or application profile data structures 320 and 330. Specifically, a behavioral score (DoM) is computed for each parameter or set of parameters in a profile data structure 320 or 330. The behavioral score can be statistically computed respective of the parameters' values such as, for example, an average connection rate per user or source. As another example, the behavioral score can be statistically computed respective of a maximum total number of sources per application. Other examples for such scores include, but are not limited to, an error state TCP score, an error state UDP, an application TCP score, an application UDP score, and so on. The computation of the behavioral scores is performed through the parsing and processing of the behavioral rules as discussed in detail herein below.

The computed scores (DoMs) are fed to the inference modules 520. As illustrated in FIG. 1, a score can be fed to one, some, or all of the inference modules 520. Each of the inference modules 520 is a programmable module configured to generate the DoF to at least one behavior group. To this end, each inference module 520 is configured to correlate its input scores based on predefined and customized behavioral rules.

In an embodiment, each inference module 520 is further configured to output the generated DoF and the respective behavior group type that the DoF is applied to. For example, the DoF may be an integer number from 1 to 10; an output of a DoF=8, and scanning indicates that the application path can be associated with "scanning behavior group." In another embodiment, the DoF may be a binary value. Collectively or alternatively, each inference module 520 can output a vector including the generated DoF and all parameters that are associated with the application path.

According to various disclosed embodiments, the scoring module 510 and the inference modules 520 can operate in both adaptive and deterministic modes. As such, the operation of modules 510 and 520 can be modified based on an adaptive mechanism (not shown). Specifically, the adaptive mechanism can tune the scoring functions (computed by the module 510) and the behavioral rules, thereby allowing the network to inject a real "environmental" context to the rules to gain real and accurate behavior impact monitoring. The disclosed behavioral rules are programmed in such way to allow adaptive changes.

The adaptive mechanism is based on an adaptive parameter and a sensitivity input. The adaptive parameter can be set according to normal learned values that are stored as part of the profile data structures 320 and 330. The sensitivity input allows a user (e.g., a network administrator) to define different sensitivity levels (e.g., high, medium, low) when computing the DoF. For example, the sensitivity level may adjust the weights assigned to different scores.

In an embodiment, the behavioral rules are human linguistics rules that are mapped by a parser to computational procedures of corresponding inference modules 520. The behavioral rules can be customized to discover new behavior groups or new behavior sensitivities in the network. The behavior rules are configured through a network monitoring language disclosed according to various embodiments.

Figure 6:
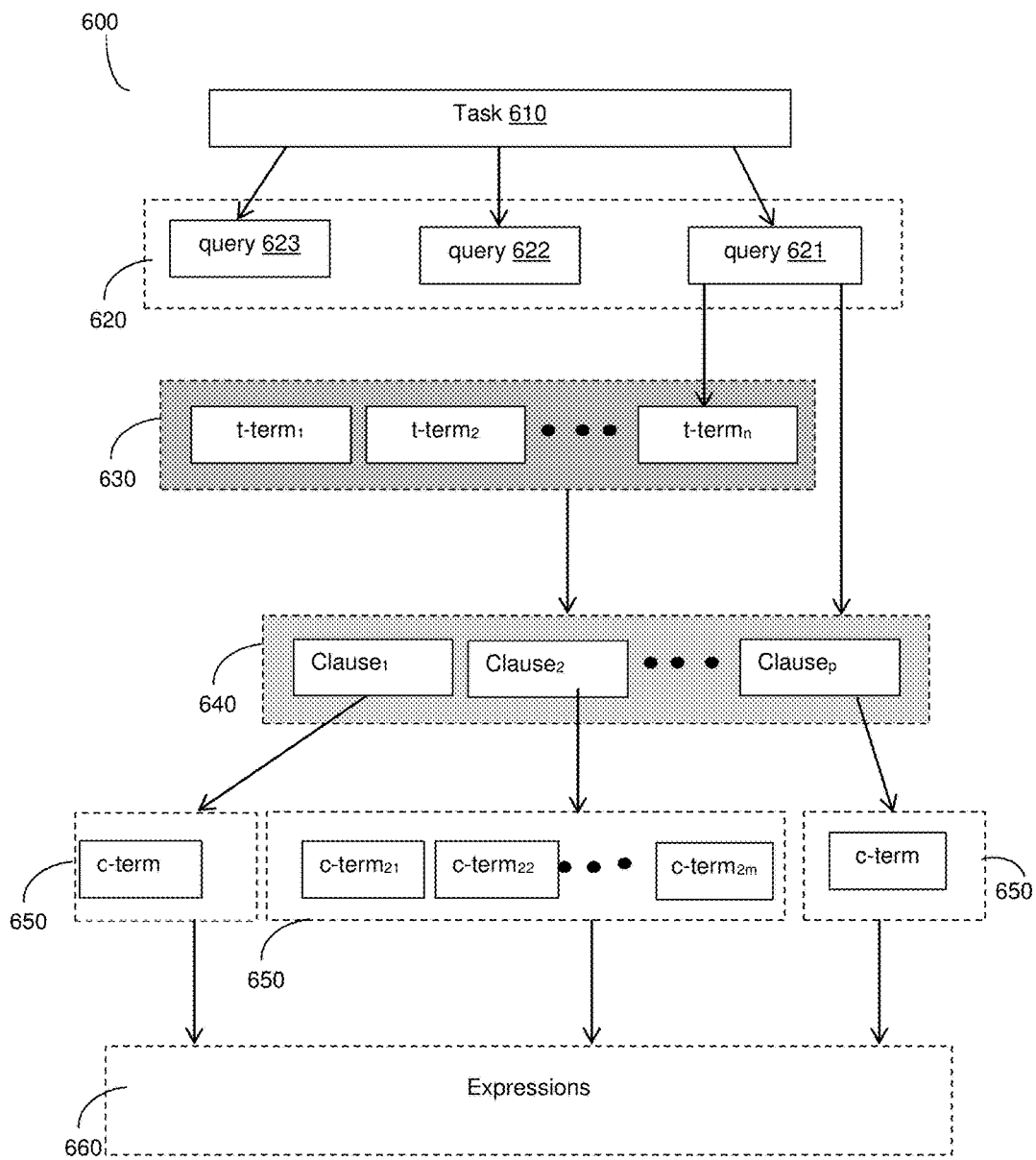
FIG. 6 is a schematic diagram of a model for programming behavioral rules using the network monitoring programming language disclosed according to one embodiment.

FIG. 6 is a schematic diagram of a model 600 for programming behavioral rules using the network monitoring programming language disclosed according to one embodiment. The model 600 is a hierarchical model in which a top-level task 610 represents one task descending downwards into levels more detailed than the previous levels. Specifically, the query level 620 descending from level 610 defines one or more queries (in this example, queries 621, 622, and 623). A query may be viewed as a behavioral rule to be evaluated for a set of application path attributes with respect to a set of behavioral parameters. As illustrated in FIG. 6, descending from a query 621 is a target level 630 representing a segment of the traffic to be monitored. The target is defined using a set of a target terms include defining one or more application path attributes and a respective assessment values. A non-limiting list of the application path attributes is provided in detail above.

The application path attributes can be evaluated against a predefined set of application path values. The network monitoring language is a set of reserved keywords to select a value of an application path attribute under observation, a set of reserved keywords to define a condition referred as abnormal behavior (or state), reserved assignment and assessment keywords, and a special syntax for proper follow-up parsing the task. The keywords for selection of application path are derived, but not limited from an application path attribute. Each such attribute is assigned by an attribute assessment value keywords including, but not limited to 'any, all', or by list of predefined labels, a list of numbers, or by single label or a single number. These labels may be application names, device names/models, operating system names/versions, geographical locations, port numbers, and so on. As an example, the list {Gmail; YouTube} contains application names, 'USA' is a single label for a geographical location, 'iOS 6.01' is a single label of an OS version, the lists {25; 110; 80; 143} and {20 or 21; 110 or 143} designate destination port numbers.

In a non-limiting embodiment, the assessment keyword value 'any' denotes that all values available in a predefined or learned list of possible values (labels) of the given attribute should make separate entities with the assigned attribute. The assessment value keyword 'all' denotes that the whole corresponding list should be aggregated in a single entity possessing the assigned attribute. This may be equivalent to ignoring the assigned attribute while filtering segments for monitoring. In case of a list assignment, each of list members have its separate entity (it may be interpreted as keyword 'any' yields a maximally comprehensive list for a given attribute), several list members may be also aggregated to one entity if they are joined by a Boolean OR. In a non-limiting embodiment, a set of the application path attributes and suggested values are automatically populated to a user. The user can select some of the suggested values or modify existing selections.

Also descending from query level 620 is a condition level 640 that represents one or more conditions. A clause in the condition level 640 is comprised of a list of terms (c-terms; in this example, c-term21 through c-term2m) defined in the term level 650 united by a Boolean AND. Two or more clauses in level 640 may be linked by a Boolean OR as alternative conditions to an expression 660, in such case a DoF of an entity produced by a query 620 is a maximum DoF of its separate alternative conditions. A c-term is at least one behavioral parameter and a condition that the at least one parameter needs to satisfy. For example, the condition may be that a packets per second (pps) is high (i.e., pps=high). In a non-limiting embodiment, a set of terms is automatically suggested to the user. The user can select which terms to use and which conditions to modify. The network monitoring programming language defines a set of reserved keywords for the terms' behavioral parameters. An exemplary and non-limiting list of such keywords is provided in Table 1.

TABLE 1

| Keyword | Description |
| --- | --- |
| pps | packet rate, packet/sec |
| bps | byte rate, byte/sec |
| isz | inverse average packet size, 1000/<packet size>, 1/byte |
| cps | new connections rate, new connections per second per application |
| cuc | concurrent connections per application, connections per application |
| afl | average application flow duration, seconds |
| afs | average application flow size, bytes |
| ats | total number of talking sources per application |
| atu | total number of talking users per application |
| sym | data symmetry |
| Res1 | Reserve prm1 |
| Res2 | Reserve prm2 |

The bottom-level expressions level 660 defines the Boolean expressions to be applied on two or more conditions. A Boolean expression may include, but is not limited to, OR, AND, XOR, and so on. As an example, a Boolean expression AND is applied between the conditions (pps=high), (isz=high). In an alternative embodiment, the Boolean expression may be replaced with an arithmetic operation, such as, but not limited to, multiplication, adder, and the like. Essentially, the behavioral parameters and the conditions are processed, in part, by the scoring and inference modules 520 to compute the DoF.

In an embodiment, the model 600 is a human interaction that can be realized through a user interface, such as a graphical user interface allowing users to easily define tasks to be processed by the behavior analyzer 340. The generated tasks may be in a form of a script file.

Following are non-limiting examples for task that can be defined using the model 600. This task includes 3 queries (behavioral rules).

1. $app='YouTube',dest='80',dev='LG',os='Android' . . . [((pps=high)&(isz=high))|((pps=high)&(isz=-high)&(ncr=high))]
2. $app='any',dest='80',dev='any',os='any' . . . [((pps=high)&(isz=high))|((pps=high)&(isz=-high)&(ncr=high))]
3. $app='any',dest={20|21;110|143;23},dev='all',os='all' . . . [((pps=high)&(isz=high))|((pps=high)&(isz=-high)&(ncr=high))]

The first query (1) relates to an application path including the attributes' labels 'YouTube' (app='YouTube') destined to port 80 (dest='80') and activated by a device LG® (dev='LG') with operating system 'Android' (os='Android'). The terms to be evaluated are either high packet rate AND small packet size, OR high packet rate AND NOT small packet size AND high new connections rate. It should be noted the Boolean expressions '&' and '|' are AND and OR, respectively.

The second query (2) evaluates the same terms as in query (1), also for all applications destined to port 80, but the evaluation of the terms, and thus the computation of the DoF is performed separately for each combination of application, device, and operating system.

The third query (3) evaluates the same terms in query (1), but for all applications destined to ports 20, 21, 110 and 143. The evaluation of the terms, and thus the computation of the DoF is performed for each application separately without filtering upon device or operating system. For each application, separate entities are generated only for the pair of destination ports 20 and 21 counted together, for the pair of destination ports 110 and 143 also counted together, and for destination port 23, that is, a total of 3 port entities per every application.

As can be understood from the above examples and the model discussed with references to FIG. 6, the syntax of a query may be presented as follows:

$target[condition]

The target is represented using a list of target terms (t-term):

t-term$_1$, t-term$_2$, . . . , t-term$_n$ where, t-term$_i$ (i=1, 2, . . . ) is attr$_i$=attrval$_i$. The value of 'attr$_i$' is selected from a list of application path keywords related to path attributes. The value of 'attrval$_i$' includes one or more attribute assessment keywords. As noted above, such keywords may be, but are not limited to, 'any', 'all', or one or more labels. The two or more labels may be aggregated using a Boolean expression as well.

Each target term (t-term) defines a specific filter or constraint for monitoring a segment of the traffic. The final target is a filtered traffic segment that satisfies to all constraints simultaneously.

The condition in the condition level 640 is represented using a set of condition terms aggregated using Boolean expressions:

clause$_1$|clause$_2$|clause$_3$| . . . |clause$_n$ where, clause$_i$ means (c-term$_{i1}$)&(c-term$_{i2}$), . . . &(c-term$_{in}$)).

The c-term is a behavioral parameter selected from a set of predefined keywords (see Table 1, for example) assessed with behavioral assessment keywords, such as low, high, normal, and so on. In an embodiment, each valid term of a behavioral attribute and its assessment keyword is mapped to an implied computational procedure for proper evaluation of its fulfillment upon targeted segment of the data traffic. That is, a condition consisting of several groups of terms yields DoF of the targeted segment of the data traffic.

The character '$' designates beginning of a query and is immediately preceding to the target. The charterers ' . . . ' in the beginning of the string designate a continuation of this string with previous one and has no additional meaning. The condition's terms are placed in square brackets '[ ]', the opening bracket also designates the end of the target, while the closing bracket designates the last symbol of a query. It should be noted that any other character can be utilized as identifiers and separators for the application path's attribute and for the terms in a task.

In order to process a task defined using the network monitoring language, the behavior analyzer 340 implements a parser (not shown). The parser may be implemented in part in the scoring modules 510, the inference module 520, and/or an independent complement.

The parsing process analyzes the task and generates a set of corresponding filters for application path's attributes to aggregate individual applications into virtual traffic entities of an application path being monitored, and maps all terms to the corresponding predefined computational procedures. The parser also checks the task validation in view of the syntax of the network monitoring language (e.g., reserved identifiers and keywords).

Figure 7:
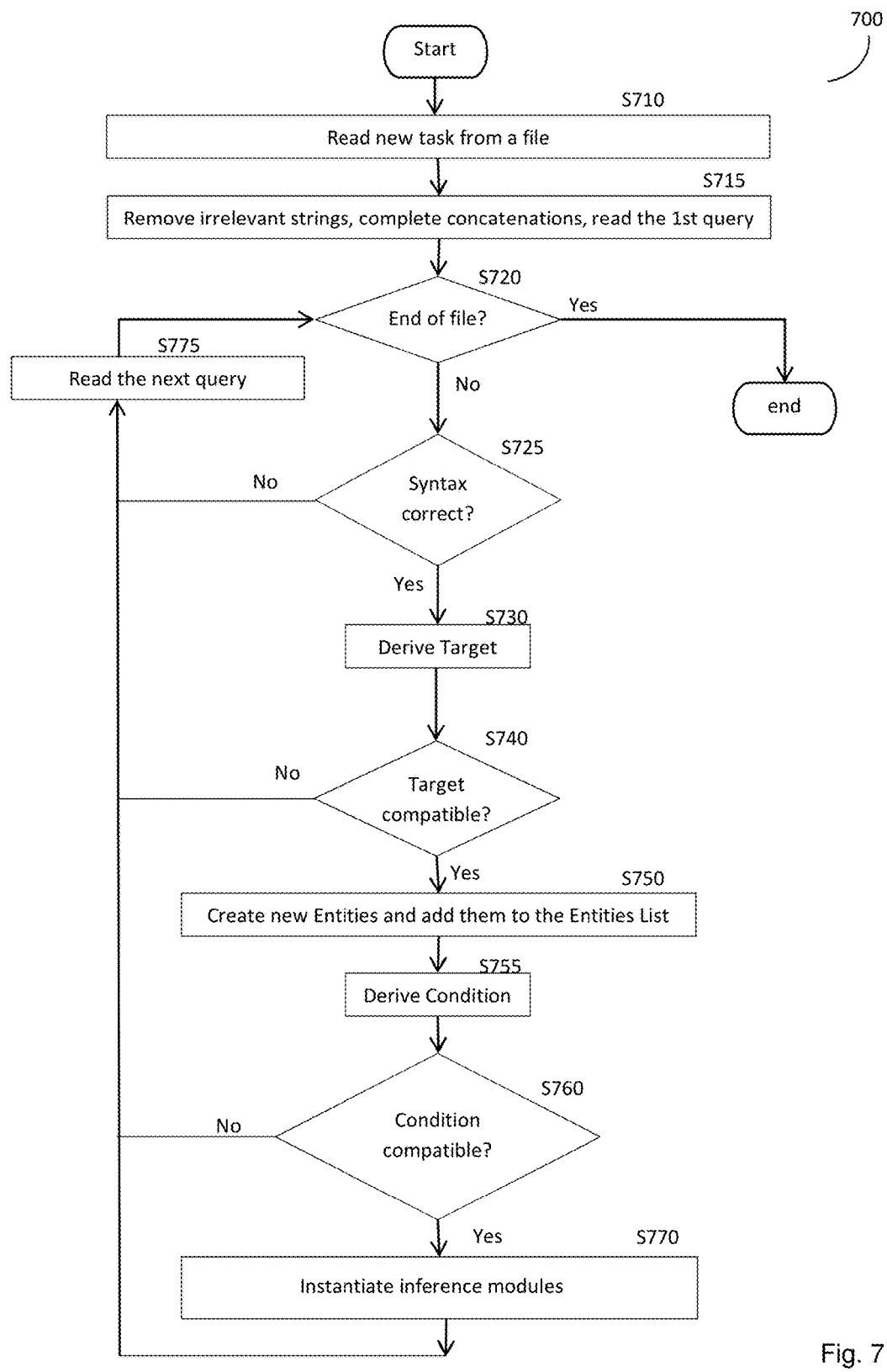
FIG. 7 is a flowchart illustrating a method for parsing a task defined using network monitoring programming language according to one embodiment.

FIG. 7 shows an exemplary and non-limiting flowchart 700 of the parsing processing according to one embodiment. At S710, a new task script file including diagnostic and validation of all elements is read. At S715, all invalid queries and irrelevant symbols are removed. For this purpose, the parsing process resolves the task for separate queries via search for the identifiers '$' and string concatenations, isolates target and condition parts of each query and detaches terms via search for commas, brackets, parenthesis and Boolean symbols (or for other relevant syntax symbols). Then the first query is read (S715).

At S720, it is check if the read query is an end of file, and if so execution ends; otherwise, execution continues with S725, where a syntax test is performed. This test includes for example, but without limitation, checking for pairing and arrangement of the brackets and parenthesis, existence of the equality signs between internal parenthesis, position of Boolean signs, and so on. If the syntax is not as defined by the language, this query is ignored and execution continues with S775 where the next query is read; otherwise, execution proceeds to S730.

At S730, the target terms are derived. At S740, for each target term it is checked if its contents are compatible with the defined keywords. That is, the target items are tested for their matching to available application path attributes and for valid values. For example, the following targets are ignored: "dev=iPhone, OS=S60" or "dest=23, app=YouTube", as Apple® devices do not use Symbian's operational system, as well as YouTube application does not use Telnet port 23. If the target terms are compatible, at S750 all valid combinations yield corresponding target terms (traffic filters) are saved as entities in a list of entities. Otherwise, execution continues with S775.

At S755, the conditions are derived from the read query. At S760, for each condition's term it is checked if its contents are compatible with the defined keywords. That is, the condition terms are tested for their matching to available behavioral attributes, assessment keyword values, and for their consistency. As an example, groups of the terms (pps=warm)&(cps=high), (pps=high)&(pps=low) or (pps=low)&(cps=low) are determined as invalid due to the first usage of a wrong keyword "warm", the second term is inconsistent, and the third term may not be defined to have a corresponding computational procedure for it. If the conditions terms are compatible, execution continues with S770; otherwise, execution proceeds with S775.

At S770, inference modules are instantiated based on the computational procedures predefined for the derived condition's terms. The inference modules are created to process the entities (traffic segments) targeted by the corresponding queries according to the conditions terms. At S775, another query is read from the task script.

Figure 8:
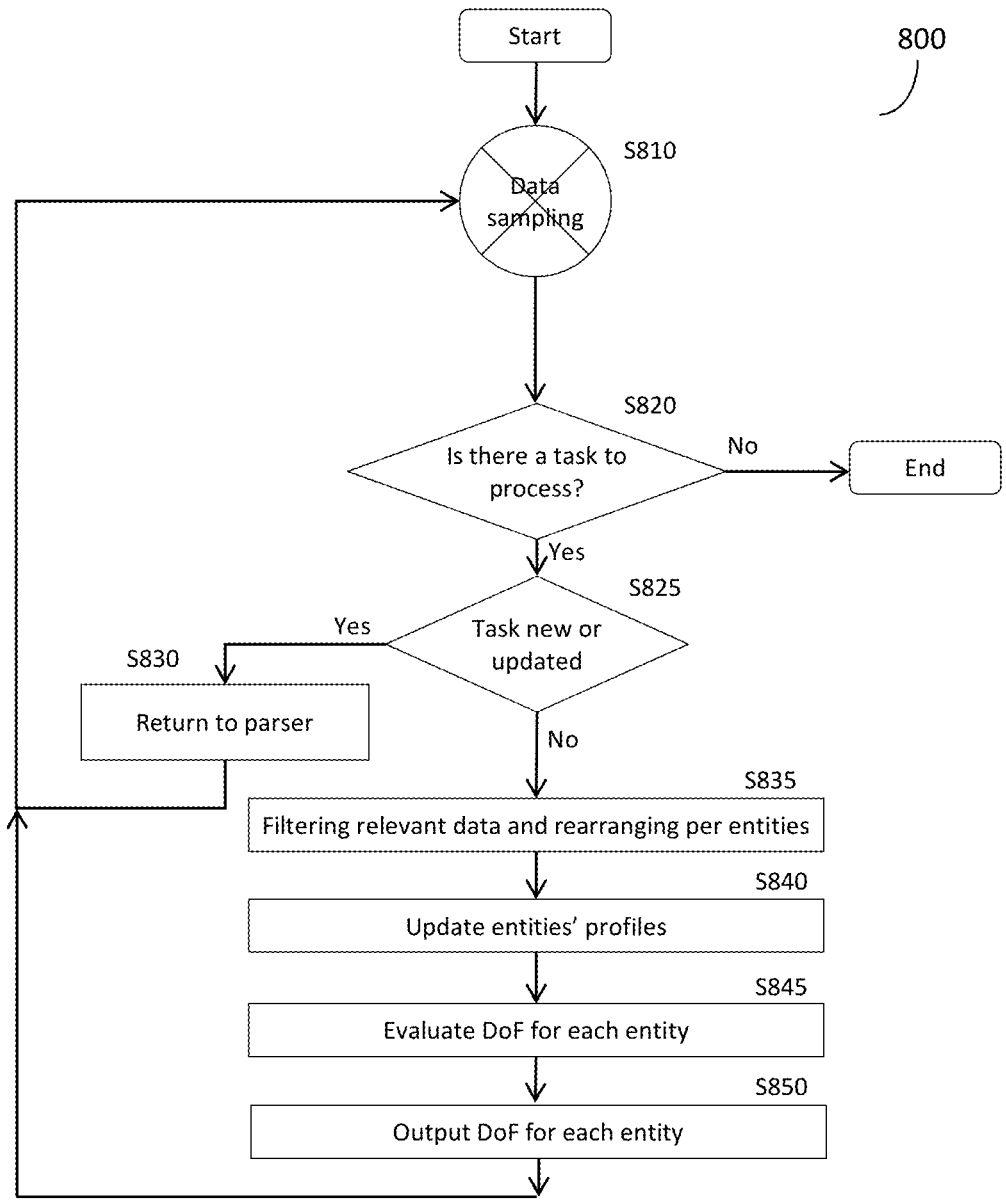
FIG. 8 is a flowchart illustrating a method for processing a task defined using network monitoring programming language according to one embodiment.

FIG. 8 is a non-limiting flowchart illustrating a method for processing a task defined using the network monitoring language according to one embodiment. At S810, data collected by the DPI engines 130 and preferably classified by the classifier 340 is sampled. In an embodiment, the data is periodically sampled.

At S820 it is checked if there is a task to process, and if so, execution continues with S825; otherwise execution ends. At S825, another check is made to determine if the task is a new task or an updated version of a task previously processed. If so, at S830, execution returns to the parsing of the task (see FIG. 7); otherwise, at S835 the sampled data is filtered to include data relevant to entities for which the DoF is computed. As noted above, the entities are produced by the parsing process which provides a list of entities of target and a list of inference modules.

At S840, the respective entity profiles are updated with the filtered data. As noted above, an entity profile includes parameters from one or more application profile and/or one or more user profiles, and/or any derivatives thereof.

At S845, for each entity the DoF is evaluated using data (parameters) in the respective entity profile. The evaluation is performed with respect to the conditions defined for the entity with data included in the respective entity profile. In an embodiment, each condition term is evaluated respective of its value, i.e., the assessment keyword value (high, low or normal). The evaluation of a term is performed the respective inference module. In an exemplary implementation, each inference module is configured with a computational procedure defined for a term. As an example, for the term pps=high a procedure Procedure1 is utilized by a first inference module, while for the term pps=low a procedure Procedure2 is utilized by a second inference module. Both computational procedures may evaluate the terms based on data included in the respective entity profile. It should be noted that the evaluated term may result, for example, in an integer number or a real number. Finally, all evaluated condition terms are aggregated based on the expressions defined in the query (e.g., Boolean expressions) to result with the DoF of the query. At S850, the DoF is output, and then execution returns to S810.

It should be noted that the output DoF may be further compared to a predefined threshold to determine an association with a behavior group. The behavior group may define variance of chatty activity, variance of malware activity, variance of scanning activity, and so on. The DoF and/or the behavior group may be displayed to a user and/or saved to future usages.

Figure 9:
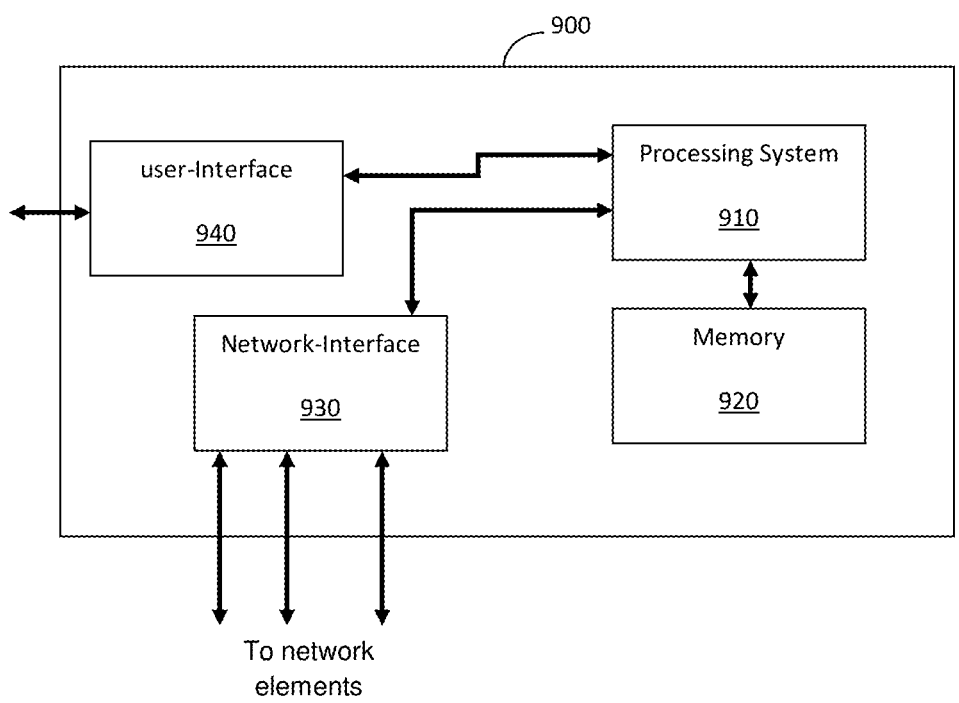
FIG. 9 is a block diagram of a central controller according to an embodiment.

FIG. 9 shows an exemplary and non-limiting block diagram of the central controller 900 constructed according to an embodiment. The central controller 900 is operable in a SDN, such as those defined above methods described in greater detail above. The central controller 900 includes a processing system 910 communicatively connected to a memory 920, a network-interface module 930, and a user interface 940.

The network-interface module 930 allows communication with the network elements of the SDN. In one embodiment, such communication uses the OpenFlow protocol discussed above through a secure channel established with each network element. In another embodiment, the communication is achieved through another control channel.

The processing system 910 uses instructions stored in the memory 920 to execute tasks generally performed by the central controllers of an SDN as well as to control and enable the operation of behavioral network intelligence processes disclosed herewith. In an embodiment the processing system 910 is further configured to process tasks defined using the network monitoring language discussed in detail above. In another embodiment, the processing system 910 together with the user interface 940 may allow the user to define or modify behavior groups using the network monitoring language discussed in detail above. Any definition or modification of behavior groups may be performed though the creating or changing of tasks as discussed in detail above. In an embodiment, a script including tasks defined using the network monitoring language can be uploaded through the user interface 940. It should be noted that such a script can be programmed by means of any computer and is not limited to the central controller 910.

In an embodiment, the processing system 910 may include one or more processors. The one or more processors may be implemented with any combination of general-purpose microprocessors, multi-core processors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

It should be noted that the teachings disclosed herein are also applicable to hybrid networks in which a SDN is a sub-network of a conventional network in which its elements cannot be programmed by a central controller. To allow the proper operation of the methods disclosed above in the hybrid network, certain network elements in the diversion path should be adapted to allow programmability by the central controller adapted to operate in a SDN (e.g., central controller).

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for configuring a behavioral network intelligence system using a network monitoring programming language, comprising:
defining at least one target of a traffic segment to be monitored using at least one application path attribute of an application, wherein the application is accessed via at least one user device connected to a network, wherein the at least one application path attribute is defined for an application path keyword and an application path assessment keyword;

defining at least one condition representing the behavior of the at least one application path attribute of the application, wherein the at least one condition is defined using a plurality of terms and Boolean expressions, each of the plurality of terms is defined for a behavior keyword and a behavior keyword assessment;

parsing the at least one target and the at least one condition to generate a list of entities; and instantiating a plurality of inference modules based on the parsing of the at least one target and the at least one condition;

wherein the at least one target and the at least one condition can be interpreted by a monitoring system to allow for determining a behavioral impact of the application on the network carrier.

2. The method of claim of 1, wherein the at least one application path attribute and the at least one condition comply with a syntax of the network monitoring programming language.

3. The method of claim 2, wherein the behavior keyword, the behavior keyword assessment, the application path keyword, and the application path assessment keyword are defined by the syntax of the network monitoring programming language.

4. The method of claim 2, wherein the behavior keyword assessment is any one of: high, low, and normal.

5. The method of claim 2, wherein the application path keyword assessment is any one of: a specific number, a specific label, a list of numbers, a list of labels, 'all', and 'any'.

6. The method of claim 2, wherein the application path keyword relates to an application path attribute including any one of: an application name, a device type, an operating system type, an operating system version, a geographical location, a browser type, an application type, and an application version.

7. The method of claim 2, wherein the behavior keyword relates to a behavioral parameter including any one of: a packet rate, a byte rate, a data direction, a plurality of new connections per second (CPS), a concurrent number of connections per application (CUC), a connection duration, and a transport protocol state.

8. The method of claim 1, further comprising:
evaluating using the inference modules at least a degree of fulfillment (DoF), wherein the DoF defines a behavior group that the plurality of terms satisfy with respect to the at least one target.

9. The method of claim 8, wherein evaluating the at least a DoF further comprises:
for each of the plurality terms:
sampling, at predefined time intervals, data of behavioral parameters related to behavior keywords defined in the term;
computing behavioral scores using the sampled data and the behavior keyword assessment; and
correlating the computed behavioral scores using the plurality of terms and Boolean expressions to generate the at least one DoF.

10. The method of claim 8, wherein the behavior group defines any one of: variance of chatty activity, variance of malware activity, and variance of scanning activity.

11. The method of claim 1, wherein the at least one condition is dynamically changed.

12. The method of claim 1, wherein the network monitoring programming language is a human linguistics programming language.

13. The method of claim 1, wherein the method is implemented in a central controller of a software defined network (SDN), wherein the SDN further comprises a plurality of network elements, and wherein the SDN is part of an infrastructure of a network carrier.

14. A non-transitory computer readable medium having stored thereon instructions for causing one or more processing units to execute the method according to claim 1.

15. A system for determining the behavioral impact of applications on a network, comprising:
a processor; and
a memory communicatively connected to the processor, the memory containing a plurality of instructions that, when executed by the processor, configure the system to:
define at least one target of a traffic segment to be monitored using at least one application path attribute of an application, wherein the application is accessed via at least one user device connected to a network, wherein the at least one application path attribute is defined for an application path keyword and an application path assessment keyword;
define at least one condition representing the behavior of the at least one application path attribute of the application, wherein the at least one condition is defined using a plurality of terms and Boolean expressions, each of the plurality of terms is defined for a behavior keyword and a behavior keyword assessment;
parse the at least one target and the at least one condition to generate a list of entities; and
instantiate a plurality of inference modules based on the parsing of the at least one target and the at least one condition;
wherein the at least one target and the at least one condition can be interpreted by a monitoring system to allow for determining a behavioral impact of the application on the network.

16. The system of claim of 15, wherein the at least one application path attribute and the at least one condition comply with a syntax of the network monitoring programming language.

17. The system of claim 16, wherein the behavior keyword, the behavior keyword assessment, the application path keyword, and the application path assessment keyword are reserved words of the network monitoring programming language.

18. The system of claim 16, wherein the behavior keyword assessment is any one of: high, low, and normal.

19. The system of claim 16, wherein the application path keyword assessment is any one of: a specific number, a specific label, a list of numbers, a list of labels, 'all', and 'any'.

20. The system of claim 16, wherein the application path keyword relates to an application path attribute including any one of: an application name, a device type, an operating system type, an operating system version, a geographical location, a browser type, an application type, and an application version.

21. The system of claim 16, wherein the behavior keyword relates to a behavioral parameter including any one of: a packet rate, a byte rate, a data direction, a plurality of new connections per second (CPS), a concurrent number of connections per application (CUC), a connection duration, and a transport protocol state.

22. The system of claim 15, wherein the system is further configured to:
- evaluate, using the interference modules, at least a degree of fulfillment (DoF), wherein the DoF defines a behavior group that the plurality of terms satisfy with respect to the at least one target.

23. The system of claim 22, wherein the system is further configured to:
- for each of the plurality terms:
- sample, at predefined time intervals, data of behavioral parameters related to behavior keywords defined in the term; and
- compute behavioral scores using the sampled data and the behavior keyword assessment,
- correlate the computed behavioral scores using the plurality of terms and Boolean expressions to generate the at least one DoF.

24. The system of claim 22, wherein the behavior group defines any one of: variance of chatty activity, variance of malware activity, and variance of scanning activity.

25. The system of claim 15, wherein the at least one condition is dynamically changed.

26. The system of claim 15, wherein the network monitoring programming language is a human linguistics programming language.

* * * * *